United States Patent [19]

Ohsaka et al.

[11] Patent Number: 4,683,289
[45] Date of Patent: Jul. 28, 1987

[54] NOVEL FLUORINE-CONTAINING POLYAMINOAMIDE AND PREPARATION THEREOF FROM FLUOROOXETANE AND POLYAMINE

[75] Inventors: Yohnosuke Ohsaka, Ibaraki; Yoshio Amimoto, Takatsuki; Yoshio Negishi, Settsu, all of Japan

[73] Assignee: Daikin Industries Ltd., Osaka, Japan

[21] Appl. No.: 786,682

[22] Filed: Oct. 11, 1985

[30] Foreign Application Priority Data

Oct. 22, 1984 [JP] Japan ................................ 59-222466
Sep. 30, 1985 [JP] Japan ................................ 60-218449

[51] Int. Cl.$^4$ ............................................. C08G 69/42
[52] U.S. Cl. ................... 528/402; 528/332; 528/363; 528/407; 528/417
[58] Field of Search ............... 528/402, 332, 363, 407, 528/417; 544/358, 386

[56] References Cited

FOREIGN PATENT DOCUMENTS 0667564 6/1979 U.S.S.R. .

Primary Examiner—Harold D. Anderson
Attorney, Agent, or Firm—Birch, Stewart, Kolasch & Birch

[57] ABSTRACT

A novel polyaminoamide of the formula:

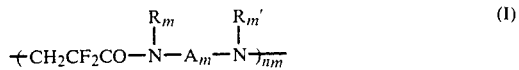

wherein $R_m$ and $R_m'$ are, the same or different, a hydrogen atom or a monovalent organic group and $A_m$ is a divalent organic group, or $R_m$ and/or $R_m'$ form a cyclic group together with $A_m$ and the nitrogen atom to which they are bonded. m changes from 1 to p (where p is a positive integer) and $n_m$ is a positive integer, which can be prepared by reacting a 2,2,3,3-tetrafluorooxetane of the formula:

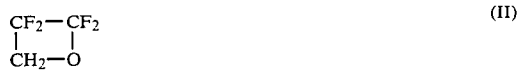

with m kind(s) of diamine(s) of the formula:

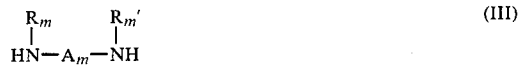

wherein m is the same as defined above.

16 Claims, No Drawings

NOVEL FLUORINE-CONTAINING POLYAMINOAMIDE AND PREPARATION THEREOF FROM FLUOROOXETANE AND POLYAMINE

FIELD OF THE INVENTION

The present invention relates to novel fluorine-containing polyaminoamides and preparation thereof.

DETAILED DESCRIPTION OF THE INVENTION

The novel polyaminoamide according to the present invention is represented by the formula:

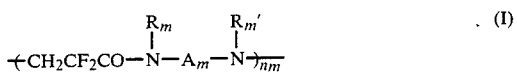

wherein $R_m$ and $R_m'$ are, the same or different, a hydrogen atom or a monovalent organic group and $A_m$ is a divalent organic group, or $R_m$ and/or $R_m'$ form a cyclic group together with $A_m$ and the nitrogen atom to which they are bonded. m changes from 1 to p (wherein p is a positive integer) and $n_m$ is a positive integer.

For example, when p is 1 (one), m represents 1 (one) and therefore the formula (I) includes one kind of the repeating unit of the formula:

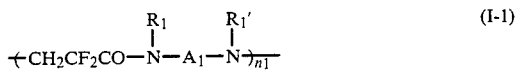

When p is 2, m represents 1 and 2 and therefore the formula (I) includes two kinds of the repeating units of the formula:

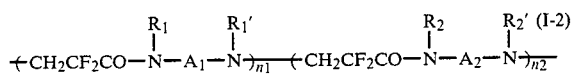

In the formula (I), the monovalent or divalent organic group may be an aliphatic, alicyclic or aromatic group. The aliphatic group may be a straight or branched group. The alicyclic or aromatic group may have at least one substituent.

The polyaminoamide (I) may be prepared by reacting a 2,2,3,3-tetrafluorooxetane (hereinafter referred to as "tetrafluorooxetane") of the formula:

with m kind(s) of diamine(s) of the formula:

wherein m is the same as defined above in a suitable solvent. The reaction is preferably carried out in the presence of a base or a basic salt to neutralize hydrogen fluoride liberated during the reaction.

The solvent is preferably one stable to the base. Specific examples of the solvent are diethyl ether, tetrahydrofuran, methylene chloride, 1,1,2trichloro-1,2,2-tri- fluoroethene, benzene, toluene, diethyleneglycol dimethyl ether and the like.

Specific examples of the base and the basic salt are hydroxides of alkali metals or alkaline earth metals (e.g., sodium hydroxide, potassium hydroxide, calcium hydroxide, etc.) and salts of alkali metals with weak acids (e.g., sodium carbonate, potassium carbonate, etc.).

The reaction temperature is usually from a room temperature to a reflux temperature of the solvent, preferably up to a temperature generated by a reaction heat.

The diamine (III) may be any one of known diamines. Since the reaction proceeds between the amino group of the diamine and tetrafluorooxetane, it is not affected by the kinds of the groups $R_m$, $R_m'$ and $A_m$. Thus, these groups may be any aliphatic or aromatic, or substituted or unsubstituted ones. In addition, $R_m$ and/or $R_m'$ may be a group containing a hetero atom such as a polyether group. $R_m$ and/or $R_m'$ may form a heterocyclic group together with $A_m$ and the nitrogen atom of the amino group. Further, the reaction according to the present invention is not influenced by the chain length of these groups.

With appropriate selection of $R_m$ and/or $R_m'$, cross-linking sites are introduced in the produced polyaminoamide according to the present invention. For example, a polymer comprising piperazine has not been able to be cross-linked. However, according to the present invention, piperazine and a diamine which provides a cross-linking site such as xylylenediamine are copolymerized with tetrafluorooxetane to give a cross-linkable copolymer. In addition, suitable selection of $R_m$ and $R_m'$ makes it possible to produce a copolymer having both hydrophilic and lipophilic groups in a single molecule.

Tetrafluorooxetane is a known compound and may be prepared by reacting tetrafluoroethylene and paraform in anhydrous hydrogen fluoride.

The fluorine-containing polyaminoamide according to the present invention is a liquid or solid polymer having an average molecular weight of 500 to 50,000, particularly 1,000 to 30,000 and useful as an ion exchange resin, an acid accepter, a heavy metal absorbent and the like. A copolymer of the invention neutralized with hydrochloric acid can be used as a water-absorbing polymer or an organic solvent absorbent.

The present invention will be hereinafter explained further in detail by following examples.

EXAMPLES 1

Copolymerization of Tetrafluorooxetane and Hexamethylenediamine

To a mixture of an aqueous solution of potassium hydroxide (0.42 mole/200 ml) and a solution of hexamethylenediamine (0.21 mole) in benzene (200 ml), a mixture of tetrafluoroxetane (19 ml, 0.21 mole) and benzene (60 ml) was dropwise added with stirring. After ceasing of the exothermic reaction, the reaction mixture was cooled to a room temperature to obtain the solid copolymer (22 g).

19F-NMR (acetone-$d_6$): 32.6 ppm (br.).

IR (KBr): 1,670 cm$^{-1}$ (C=O) and 3,400–3,300 cm$^{-1}$ (N—H).

EXAMPLES 2–8

In the same manner as in Example 1 but using a following diamine in place of hexamethylenediamine and, in Examples 7 and 8, using diethyl ether in place of benzene, the reaction was carried out to obtain a solid copolymer having following repeating units.

(Example 2)

(Example 3)

(Example 4)

IR (KBr): 1,680 cm$^{-1}$, 2,950 and 2,880 cm$^{-1}$ (C—H) and 3,340 cm$^{-1}$ (N—H).

(Example 5)
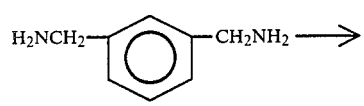

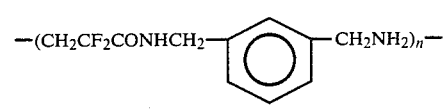

(Example 6)
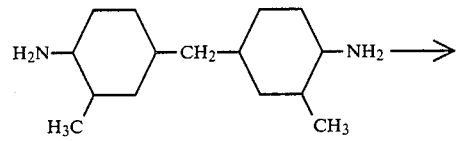

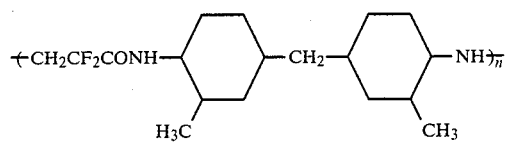

IR (film): 1,680 cm$^{-1}$ (C=O), 2,910 and 2,840 cm$^{-1}$ (C—H) and 3,300 cm$^{-1}$ (N—H).

(Example 7)
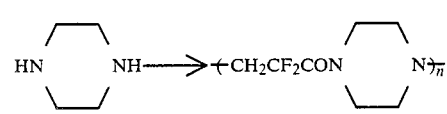

(Example 8)
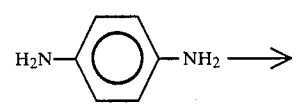

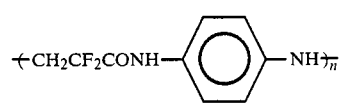

IR (KBr): 1,680 cm$^{-1}$, 3,340 and 3,330 cm$^{-1}$ (N—H).

In each of Examples 1-6, the same product is produced in the same manner as above but using potassium carbonate in place of potassium hydroxide.

EXAMPLE 9

Copolymerization of Tetrafluorooxetane and Hexamethylenediamine

To an ice cooled solution of potassium carbonate (75 g, 0.54 mole) in water (100 ml), a mixture of dichloromethane (100 ml) and 1,1,2-trichloro-1,2,2-trifluoroethane (100 ml) was added followed by the addition of tetrafluorooxetane (40 ml, 0.44 mole). As soon as stirring of the mixture was started, a solution of hexamethylenediamine (50 ml, 0.36 mole) in water (100 ml) was added with adjusting the addition rate by observing the refluxing state of the mixture. After the completion of the addition (10-15 minutes), stirring was further continued for 30 minutes. Then, additional tetrafluorooxetane (10 ml, 0.11 mole) was added and heated to reflux for about 30 minutes. Thereafter, the solvents and the unreacted monomers were evaporated to obtain a granular product, which was washed with water, boiled in water (each 600 ml) twice, again washed with water and dried to obtain the copolymer (45 g). Yield, 60%.

EXAMPLE 10

Copolymerization of Tetrafluorooxetane and Piperazine

To a mixture of a solution of piperazine (23 g, 0.27 mole) in tetrahydrofuran (200 ml) and a solution of sodium hydroxide (12 g, 0.3 mole) in water (100 ml), a solution of tetrafluorooxetane (34 g, 0.26 mole) in diethyl ether (150 ml) was dropwise added with stirring. After the completion of addition, stirring was further continued for about 2 hours. A precipitated product was filtered by a suction filter, washed with water and then with acetone and dried to obtain the copolymer. The structure of the copolymer was determined from IR and NMR analyses. The average molecular weight measured by the vapor pressure method was 8,200 (corresponding to the average number of the repeating units of about 52).

EXAMPLE 11

In the same manner as in Example 10 but using p-phenylenediamine in place of piperazine, the reaction was carried out to obtain the copolymer.

A portion of the copolymer soluble in methanol had an average molecular weight of 715 (corresponding to the average number of the repeating units of about 3).

EXAMPLE 12

Copolymerization of Tetrafluorooxetane With Piperazine and m-Xylylenediamine (1:1)

In a 500 ml separable flask equipped with a dropping funnel, a stirrer and an iced condenser, a suspension of piperazine (5.68 g, 0.066 mole) in a solution of m-xylylenediamine (8.99 g, 0.66 mole) in tetrahydrofuran (100 ml), and a solution of potassium hydroxide (14.82 g, 0.264 mole) in water (100 ml) were charged. To the ice cooled mixture in the flask, a solution of tetrafluorooxetane (17.5 g, 0.135 mole) in diethyl ether (75 ml) was dropwise added over about 1 hour with vigorous stirring. After the completion of addition, stirring was continued for 6 hours at a room temperature. After the reaction mixture was allowed to stand, the upper layer of the solution was discarded by decantation, and the lower layer containing an insoluble material was poured in water (about 1 liter). A precipitated soft mass was washed with water several times to solidify it. The solid product was dried, powdered, washed with water three times and again dried to obtain the copolymer (19.3 g). Yield, 69%. Tg, about 60° C. Average molecular weight, about 4,100 (measured by the equilibrium vapor pressure method in acetone at 35° C.).

IR (film): 3,300, 1,690–1,650, 1,540 and 1,440 cm$^{-1}$.

$^{19}$F-NMR (acetone-d$_6$): 23.5, 31.3 and 32.7 ppm (standard, TFA).

$^1$H-NMR (acetone-d$_6$): δ(ppm)=2.49 (s), 2.5–3.4 (m), 3.78 (s), 4.43 (s), 7.2 (br. s) and 8.4–8.5 (br. s).

From the ratio of integrated intensities of these absorptions, the molar ratio of piperazine and m-xylylenediamine was found to be about 2:5.

Solubility:

Hardly soluble in chloroform.

Soluble in acetone, tetrahydrofuran, 2,2,3,3,3-pentafluoropropanol and hydrochloric acid.

EXAMPLE 13

Copolymerization of Tetrafluorooxetane with Hexamethylenediamine and Piperazine (1:1)

In a 500 ml separable flask equipped with a dropping funnel, a stirrer and an iced condenser, a solution of potassium carbonate (30 g, 0.22 mole) in water (50 ml), dichloromethane (50 ml) and 1,1,2-trichloro-1,2,2-trifluoroethane (50 ml) were charged and cooled on an ice bath. Tetrafluorooxetane (20 ml, 0.22 mole) was added, and then a solution of hexamethylenediamine (11.6 g, 0.10 mole) and piperazine (8.6 g, 0.10 mole) in water (50 ml) was dropwise added with vigorous stirring. The addition rate was adjusted as high as possible but not so high as to cause vigorous refluxing. After the completion of addition, stirring was continued for 2 hours on an ice bath. Then, excess tetrafluorooxetane and the solvents were evaporated to give a granular product, which was washed with water and hot water twice and dried to obtain the copolymer (21.0 g).

Yield, 50%.

EXAMPLE 14

Copolymerization of Tetrafluorooxetane with Hexamethylenediamine and Piperazine (1:4)

In a 1,000 ml separable flask equipped with a dropping funnel, a stirrer and an iced condenser, a solution of potassium carbonate (75 g, 0.54 mole) in water (100 ml) and a mixture of dichloromethane (100 ml) and 1,1,2-trichloro-1,2,2-trifluoroethane (100 ml) were charged successively and cooled on an ice bath. Tetrafluorooxetane (40 ml, 0.44 mole) was added, and then a solution of hexamethylenediamine (8.17 g, 0.070 mole) and piperazine (24.56 g, 0.285 mole) in water (100 ml) was dropwise added with vigorous stirring. The addition rate was adjusted as high as possible but not so high as to cause vigorous refluxing (about 10 minutes). After the completion of addition, stirring was continued for 30 minutes. Then, additional tetrafluorooxetane (10 ml, 0.11 mole) was added. The ice bath was replaced by a water bath, and the reaction mixture was heated to reflux for 30 minutes. Excess tetrafluorooxetane and the solvents were evaporated to give a granular product, which was washed with water several times and dried to obtain the copolymer (44.8 g). Yield, 69%. Average molecular weight, about 1,500 (measured by the same method as in Example 12 in 2,2,3,3,3-pentafluoropropanol at 50° C.).

IR (KBr): 1,660 and 1,550 cm$^{-1}$.

EXAMPLE 15

Copolymerization of Tetrafluorooxetane with Hexamethylenediamine and Piperazine (1:9)

In a 500 ml separable flask equipped with a dropping funnel, a stirrer and an iced condenser, a suspension of hexamethylenediamine (1.54 g, 0.013 mole) and piperazine (10.27 g, 0.119 mole) in tetrahydrofuran (100 ml) and a solution of potassium hydroxide (14.85 g, 0.265 mole) in water (100 ml) were charged and stirred on an ice bath. A solution of tetrafluorooxetane (17.22 ml, 0.132 mole) in diethyl ether (75 ml) was dropwise added over about 1 hour. After the completion of addition, the ice bath was removed, and the mixture was stirred overnight at a room temperature. A precipitated granular product was filtered, washed with water three times and dried to obtain the copolymer (9.66 g). Yield, 41%. Average molecular weight, about 13,000 (measured by the same method as in Example 14).

IR (film): 3,300, 1,660 and 1,540 cm$^{-1}$.

EXAMPLE 16

Copolymerization of Tetrafluorooxetane with Piperazine and m-Xylylenediamine (1:1)

In a 500 ml separable flask equipped with a dropping funnel, a stirrer and an iced condenser, a solution of potassium carbonate (37.5 g, 0.27 mole) in water (50 ml) and a mixture of dichloromethane (50 ml) and 1,1,2-trichloro-1,2,2-trifluoroethane (50 ml) were charged successively and cooled on an ice bath. Tetrafluorooxetane (20 ml, 0.22 mole) was added, and then a solution of piperazine (7.7 g, 0.0894 mole) in water (50 ml) in which m-xylylenediamine (12.2 g, 0.0896 mole) had been dissolved (7.7 g, 0.0894 mole) was dropwise added over about 17 minutes with vigorous stirring. After continuing stirring for further 15 minutes, the mixture was further stirred at a room temperature for 1 hour. Then, excess tetrafluorooxetane and the solvents were evaporated to give a white soft mass, which was washed with water and dried. The dried product was powdered and washed with water five times to obtain the copolymer (26.5 g). Yield, 71%. Average molecular weight of a portion soluble in acetone, about 600 (measured by the same method as in Example 12).

IR (film): 1,680, 1,660 and 1,540 cm$^{-1}$.

$^{19}$F-NMR: 27.7 and 31.1 ppm (standard, TFA)

$^1$H-NMR: δ(ppm)=3.2–4.3 (m), 6.7–7.3 (m) and 7.7 (br. s) (standard, TFA).

$^{19}$F-NMR (acetone-d$_6$): 31.1 and 32.7 ppm (standard, TFA).

$^1$H-NMR (acetone-d$_6$): δ(ppm)=2.49 (s), 2.5–3.4 (m), 3.78 (s), 4.43 (s), 7.2 (br. s) and 8.4–8.5 (br. s).

From the ratio of integrated intensities of these absorptions, the molar ratio of piperazine and m-xylylenediamine was found to be about 3:5.

Solubility:

Hardly soluble in chloroform, tetrahydrofuran, hydrochloric acid, methanol and dimethylsulfoxide.

Soluble in acetone, 2,2,3,3,3-pentafluoropropanol, acetic acid and trifluoroacetic acid.

EXAMPLE 17

Copolymerization of Tetrafluorooxetane with Piperazine and 3,3'-dimethyl-4,4'-diaminodicyclohexylmethane (1:1)

In a 500 ml separable flask equipped with a dropping funnel, a stirrer and an iced condenser, a solution of potassium carbonate (14.9 g, 0.266 mole) in water (100 ml), a solution of 3,3'-dimethyl-4,4'-diaminodicyclohexylmethane (15.7 g, 0.066 mole) in tetrahydrofuran (100 ml) and piperazine (5.7 g, 0.066 mole) were charged. A solution of tetrafluorooxetane (17.2 ml, 0.132 mole) in diethyl ether (75 ml) was dropwise added over about 1 hour on an ice bath with vigorous stirring. After the completion of addition, the ice bath was removed and the mixture was stirred for 3 hours at a room temperature. The reaction mixture was then poured in water (about 1 liter) to precipitate a soft mass, which was washed with water to solidify it The solid product was dried, powdered, washed with water three times and again dried to obtain the copolymer (29.2 g). Yield, 80%. Tg, about 65° C. and 110° C. Average molecular weight, about 6,600 (measured by the same method as in Example 12).

IR (film): 3,300, 2,930, 1,680, 1,550 and 1,450 cm$^{-1}$.

$^{19}$F-NMR (CDCl$_3$): 23.8, 30.3 and 31.7 ppm (standard, TFA).

$^1$H-NMR (CDCl$_3$): δ(ppm)=0.8-2.1 (m), 2.7 (s), 2.9-3.4 (m) and 6.7 (br. s).

From the ratio of integrated intensities of these absorptions, the molar ratio of piperazine and 3,3'-dimethyl-4,4'-diaminodicyclohexylmethane was found to be about 1:2.

Solubility:

Hardly soluble in hydrochloric acid and dimethylsulfoxide.

Soluble in chloroform, acetone, tetrahydrofuran and 2,2,3,3,3-pentafluoropropanol.

EXAMPLE 18

Copolymerization of Tetrafluorooxetane with m-Xylylenediamine and 3,3'-Dimethyl-4,4'-diaminodicyclohexylmethane (1:1)

In a 500 ml separable flask equipped with a dropping funnel, a stirrer and an iced condenser, a solution of m-xylylenediamine (9.0 g, 0.066 mole) and 3,3'-dimethyl-4,4'-diaminodicyclohexylmethane (15.7 g, 0.066 mole) in benzene (100 ml) was charged followed by the addition of a solution of potassium carbonate (18.5 g, 0.132 mole) in water (50 ml). Then, a solution of tetrafluorooxetane (17.2 g, 0.132 mole) in benzene (50 ml) was dropwise added on an ice bath with vigorous stirring. After the completion of addition, the ice bath was remove and stirring was continued for about 3 hours at a room temperature to precipitate a soft mass, which was washed with water, dried and powdered. The powder was washed with water three times and air dried to obtain the copolymer (30.4 g). Yield, 83%. Tg, about 65° C. Average molecular weight, about 1,200 (measured by the same method as in Example 12).

IR (film): 1,685 cm$^{-1}$.

$^{19}$F-NMR (acetone-d$_6$): 32.9 ppm (standard, TFA).

$^1$H-NMR (acetone-d$_6$): δ(ppm)=0.8-2.2 (m), 3.2 (t), 3.80 (s), 4.44 (s) and 7.17 (br. s).

From the ratio of integrated intensities of these absorptions, the molar ratio of two diamines was found to be about 1:1 substantially in accordance with the charged amounts.

Solubility:

Hardly soluble in hydrochloric acid.

Soluble in chloroform, acetone, tetrahydrofuran and 2,2,3,3,3-pentafluoropropanol.

EXAMPLE 19

Copolymerization of Tetrafluorooxetane with Hexamethylenediamine and 3,3'-Dimethyl-4,4'-diaminodicyclohexylmethane (1:1)

In a 500 ml separable flask equipped with a dropping funnel, a stirrer and an iced condenser, a solution of potassium carbonate (30 g, 0.22 mole) in water (50 ml) and a solution of hexamethylenediamine (11.6 g, 0.10 mole) in water (150 ml) in which 3,3'-dimethyl-4,4'-diaminodicyclohexylmethane (23.8 g, 0.10 mole) was dissolved were charged. Then, a solution of tetrafluorooxetane (20 ml, 0.22 mole) in 1,1,2-trichloro-1,2,2-trifluoroethane (20 ml) was dropwise added on an ice bath with vigorous stirring. After the completion of addition, the ice bath was replaced by a water bath, and stirring was continued for about 1 hour. Then, excess tetrafluorooxetane and the solvent were evaporated to give a granular product, which was washed with water and hot water twice and dried to obtain the copolymer (32.4 g). Yield, 55%.

EXAMPLE 20

Copolymerization of Tetrafluorooxetane with Hexamethylenediamine and 3,3'-Dimethyl-4,4'-diaminodicyclohexylmethane (1:1)

In a 500 ml separable flask equipped with a dropping funnel, a stirrer and an iced condenser, a solution of potassium carbonate (30 g, 0.22 mole) in water (50 ml), dichloromethane (50 ml) and 1,1,2-trichloro-1,2,2-trifluoroethane (50 ml) were charged and cooled on an ice bath. Tetrafluorooxetane (20 ml, 0.22 mole) was added, and then a solution of hexamethylenediamine (11.6 g, 0.10 mole) in water (50 ml) in which 3,3'-dimethyl-4,4'-diaminodicyclohexylmethane (23.8 g, 0.10 mole) had been dissolved was dropwise added with vigorous stirring. The addition rate was adjusted as high as possible but not so high as to cause vigorous refluxing. After the completion of addition, the ice bath was replaced by a water bath, and stirring was continued for about 3 hours. Then, excess tetrafluorooxetane and the solvent were evaporated to give a product mass, which was washed with water, powdered, washed with water in a Soxhslet's extractor and dried to obtain the copolymer (40.7 g). Yield, 69%.

EXAMPLE 21

Copolymerization of Tetrafluorooxetane with Hexamethylenediamine and m-Xylylenediamine (1:1)

In a 500 ml separable flask equipped with a dropping funnel, a stirrer and an iced condenser, a solution of potassium carbonate (30 g, 0.22 mole) in water (40 ml), dichloromethane (40 ml) and 1,1,2-trichloro-1,2,2-trifluoroethane (40 ml) were charged and cooled on an ice bath. Tetrafluorooxetane (20 ml, 0.22 mole) was added, and then a solution of hexamethylenediamine (8.3 g, 0.072 mole) in water (40 ml) in which m-xylylenediamine (9.8 g, 0.072 mole) was dissolved was dropwise added with vigorous stirring. The addition rate was adjusted as high as possible but not so high as to cause vigorous refluxing. After the completion of addition, stirring was continued for 30 minutes. Thereafter, additional tetrafluorooxetane (4 ml, 0.04 mole) was added and heated to reflux on a water bath for 30 minutes. Then excess tetrafluorooxetane and the solvents were evaporated to give a product mass, which was washed with water and hot water twice and dried to obtain the copolymer (22.4 g). Yield, 72%.

EXAMPLE 22

Copolymerization of Tetrafluorooxetane with Hexamethylenediamine and Tetramethylenediamine (1:1)

In a 500 ml separable flask equipped with a dropping funnel, a stirrer and an iced condenser, a solution of potassium carbonate (30 g, 0.22 mole) in water (50 ml), dichloromethane (50 ml) and 1,1,2-trichloro-1,2,2-trifluoroethane (50 ml) were charged and cooled on an ice bath. Tetrafluorooxetane (20 ml, 0.22 mole) was added, and then a solution of hexamethylenediamine (11.6 g, 0.10 mole) and tetramethylenediamine (8.8 g, 0.10 mole) in water (50 ml) was dropwise added with vigorous stirring. The addition rate was adjusted as high as possible but not so high as to cause vigorous refluxing. After the completion of addition, the ice bath was replaced by a water bath and stirring was continued for 4 hours with cooling with ice. Then, excess tetrafluorooxetane and the solvents were evaporated to give a product mass, which was washed with water and hot water twice and dried to obtain the copolymer (16.4 g). Yield, 39%.

EXAMPLE 23

Copolymerization of Tetrafluorooxetane with Hexamethylenediamine and octamethylenediamine (1:1)

In a 500 ml separable flask equipped with a dropping funnel, a stirrer and an iced condenser, a solution of potassium carbonate (15 g, 0.11 mole) in water (25 ml), dichloromethane (25 ml) and 1,1,2-trichloro-1,2,2-trifluoroethane (25 ml) were charged and cooled on an ice bath. Tetrafluorooxetane (20 ml, 0.22 mole) was added, and then a solution of hexamethylenediamine (5.8 g, 0.05 mole) and octamethylenediamine (7.2 g, 0.05 mole) in water (25 ml) was dissolved was dropwise added with vigorous stirring. The addition rate was adjusted as high as possible but not so high as to cause vigorous refluxing. After the completion of addition, the ice bath was replaced by a water bath and stirring was continued for 3 hours. Then, tetrafluorooxetane and the solvents were evaporated to give a product mass, which was washed with water and hot water twice and dried to obtain the copolymer (17.5 g). Yield, 72%.

EXAMPLE 24

Copolymerization of Tetrafluorooxetane with Hexamethylenediamine and Dodecamethylenediamine (1:1)

In a 500 ml separable flask equipped with a dropping funnel, a stirrer and an iced condenser, a solution of potassium carbonate (30 g, 0.22 mole) in water (50 ml), dichloromethane (50 ml) and 1,1,2-trichloro-1,2,2-trifluoroethane (50 ml) were charged and cooled on an ice bath. Tetrafluorooxetane (20 ml, 0.22 mole) was added, and then a solution of hexamethylenediamine (11.6 g, 0.10 mole) in water (50 ml) in which dodecamethylenediamine (20.3 g, 0.10 mole) had been dissolved was dropwise added with vigorous stirring. The addition rate was adjusted as high as possible but not so high as to cause vigorous refluxing. After the completion of addition, the ice bath was replaced by a water bath and stirring was continued for 3 hours on an ice bath. Then, excess tetrafluorooxetane and the solvents were evaporated to give a product mass, which was washed with water and hot water twice and dried to obtain the copolymer (39.6 g). Yield, 72.5%.

EXAMPLE 25

Copolymerization of Tetrafluorooxetane with Piperazine, m-Xylylenediamine and 3,3'-Dimethyl-4,4'-diaminodicyclohexylmethane (1:1:1)

In a 500 ml separable flask equipped with a dropping funnel, a stirrer and an iced condenser, a solution of m-xylylenediamine (6.0 g, 0.044 mole) and 3,3'-dimethyl-4,4'-diaminodicyclohexylmethane (10.5 g, 0.044 mole) in tetrahydrofuran (100 ml), piperazine (3.8 g, 0.044 mole) and a solution of calcium carbonate (14.9 g, 0.266 mole) in water (100 ml) were charged and cooled on an ice bath. A solution of tetrafluorooxetane (17.2 g, 0.132 mole) in diethyl ether (75 ml) was dropwise added over about 1 hour with vigorous stirring. The addition rate was adjusted as high as possible but not so high as to cause vigorous refluxing. After the completion of addition, the ice bath was removed and stirring was continued for about 6 hours at a room temperature. Then, the reaction mixture was poured in water (about 1 liter) to precipitate a pasty product, which was washed with water several times to solidify it. The solid product was powdered, washed with water three times and air dried to obtain the copolymer (31.75 g). Yield 93%.

IR (film): 3,320, 2,920, 1,680, 1,540 and 1,450 cm$^{-1}$.

$^{19}$F-NMR (acetone-d$_6$): 31.0 and 32.8 ppm (standard, TFA).

$^1$H-NMR (acetone-d$_6$): δ(ppm) = 80.8–2.2 (m), 2.5–2.8 (m), 2.9–3.5 (m), 3.85 (s), 4.50 (s), 7.26 (br. s) and 8.4 (br. s).

From the ratio of integrated intensities of these absorptions, the molar ratio of piperazine, m-xylenediamine and 3,3'-dimethyl-4,4'-diaminodicyclohexylmethane was found to be about 8:13:15.

Solubility:

Hardly soluble in hydrochloric acid

Soluble in chloroform, acetone, tetrahydrofuran and 2,2,3,3,3-pentafluoropropanol.

What is claimed is:

1. A polyaminoamide, having recurring units, of the formula:

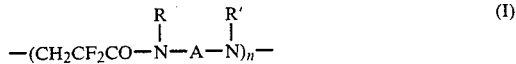

wherein R and R' are the same or different and represent a hydrogen atom or a monovalent organic group and A is a divalent organic group; or where R and R' are bound together to form a cyclic group together with A and the nitrogen atom to which they are bonded and n is a positive integer greater than zero.

2. A polyaminoamide of claim 1 having recurring units of the formula:

3. A polyaminoamide of claim 1 having recurring units of the formula:

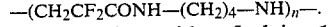

4. A polyaminoamide of claim 1 having recurring units of the formula:

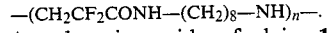

5. A polyaminoamide of claim 1 having recurring units of the formula:

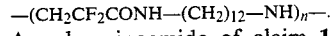

6. A polyaminoamide of claim 1 having recurring units of the formula:

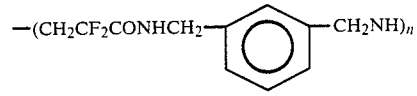

7. A polyaminoamide of claim 1 having recurring units of the formula:

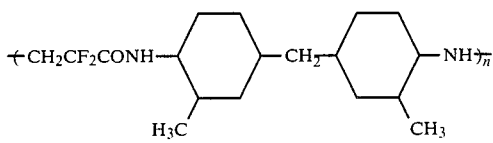

8. A polyaminoamide of claim 1 having recurring units of the formula:

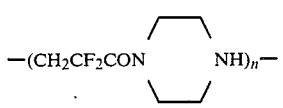

9. A polyaminoamide of claim 1 having recurring units of the formula:

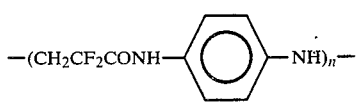

10. A process for preparing a polyaminoamide, having recurring units, of the formula:

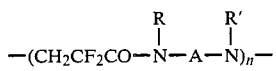  (I)

wherein R and R' are the same or different and represent a hydrogen atom or a monovalent organic group and A is a divalent organic group; or where R and R' are bound together to form a cyclic group together with A and the nitrogen atom to which they are bonded and n is a positive integer greater than zero; which method comprises reacting 2,2,3,3-tetrafluorooxetane of the formula:

  (II)

with diamine(s) of the formula:

  (III)

11. A process according to claim 10, wherein the reaction is carried out in a solvent.

12. A process according to claim 10, wherein the solvent is one selected from the group consisting of diethyl ether, tetrahydrofuran, methylene chloride, 1,1,2-trichloro-1,2,2-trifluoroethane, benzene, toluene and diethyleneglycol dimethyl ether.

13. A process according to claim 10, wherein the reaction is carried out in the presence of a base or a basic salt.

14. A process according to claim 13, wherein the base is an alkali metal hydroxide.

15. A process according to claim 13, wherein the base is an alkaline earth metal hydroxide.

16. A process according to claim 13, wherein the basic salt is a salt of an alkali metal with a weak acid.

* * * * *